United States Patent [19]
Tsigdinos et al.

[11] 3,912,660
[45] Oct. 14, 1975

[54] METHOD FOR MAKING HIGH SURFACE AREA MOLYBDENUM METAL

[75] Inventors: George A. Tsigdinos; Calvin J. Hallada, both of Ann Arbor; Robert W. McConnell, South Lyon, all of Mich.

[73] Assignee: AMAX Inc., New York, N.Y.

[22] Filed: Dec. 26, 1973

[21] Appl. No.: 427,487

[52] U.S. Cl.............. 252/465; 75/84; 117/107.2 R; 252/458; 252/467
[51] Int. Cl.²........................................ B01J 23/16
[58] Field of Search........ 252/458, 467, 465; 75/84; 117/107.2 R

[56] References Cited
UNITED STATES PATENTS
2,799,661   7/1957   DeRosset........................... 252/465
3,676,332   7/1972   Johnson............................. 252/465

Primary Examiner—Helen M. S. Sneed
Attorney, Agent, or Firm—Harness, Dickey & Pierce

[57] ABSTRACT

A process for preparing metallic molybdenum and coatings of metallic molybdenum on particulated carrier materials in which the molybdenum metal is characterized as being of a high surface area usually substantially in excess of 100 square meters per gram. The process involves the formation of a molybdenum (VI) oxalate compound, aquaoxalatomolybdic (VI) acid, $H_2[MoO_3(C_2O_4)H_2O] \cdot H_2O$, by reacting molybdenum trioxide and oxalic acid in aqueous solution, for example, which thereafter can be applied to a particulated carrier material and the water evaporated or the molybdenum (VI) oxalate compound can be recovered directly from the solution by evaporation. The molybdenum (VI) oxalate compound either by itself or in the form of a coating on a particulated carrier is reduced with hydrogen at a temperature of from about 400° up to 600°C, producing metallic molybdenum of very high surface area.

10 Claims, No Drawings

METHOD FOR MAKING HIGH SURFACE AREA MOLYBDENUM METAL

BACKGROUND OF THE INVENTION

Metallic molybdenum in a physical state in which it is possessed of a high surface area per unit weight has utility in a variety of uses, included among which is its use as a catalyst in liquid and vapor phase reactions. It has been conventional in accordance with prior art practices to prepare metallic molybdenum of relatively high surface area by the hydrogen reduction of molybdenum dioxide ($MoO_2$) or molybdenum pentachloride. The reduction of molybdenum dioxide by hydrogen can be carried out at temperatures as low as 500°C, whereby metallic molybdenum is obtained having a maximum surface area of about 50 square meters per gram ($m^2/g$) upon essentially complete reduction. When higher temperatures up to 600°C are employed during the hydrogen reduction step, the surface area of the metallic molybdenum is considerably lower than that obtained at the 500°C temperature. When the usual temperature of about 900°C is used for the hydrogen reduction of $MoO_2$, the resulting metal has a surface area of only about 1 $m^2/g$. The hydrogen reduction of molybdenum pentachloride results in a pyrophoric product which has a surface area less than about 50 $m^2/g$, rendering the material unsatisfactory for some uses and less efficient in others in comparison to high surface area metallic molybdenum prepared in accordance with the practice of the present invention.

In addition to the disadvantages associated with the aforementioned prior art techniques and the comparatively low surface area of the product produced, the use of molybdenum dioxide as a starting material makes it extremely difficult to deposit a coating of molybdenum metal on carrier materials such as catalyst supports due to the extreme insolubility of the oxide compound. Similarly, the hydrolytic instability of molybdenum pentachloride ($MoCl_5$) also detracts from the formation of metallic molybdenum coatings on catalyst supports and the resultant reduced product obtained usually contains a residual chloride impurity which constitutes a detrimental contaminant in many end uses. The hydrogen reduction of the pentachloride is also undesirable due to the highly corrosive nature of the hydrogen chloride gas produced during the reduction steps.

Attempts to overcome the foregoing problems by modifying the conditions under which the hydrogen reduction step is carried out employing molybdenum dioxide and molybdenum trioxide as the starting material for large scale production runs has been unsatisfactory due to the formation of a metallic molybdenum product having surface areas of only 1 to 2 $m^2/g$.

The foregoing problems of producing metallic molybdenum with inadequate surface area and the difficulty of applying a coating of a reducible molybdenum compound to the surfaces of porous carrier materials have been overcome in accordance with the practice of the present invention providing for a metallic molybdenum product of unique physical structure which is possessed of surface areas substantially above those heretofore obtainable and which can readily be produced in the form of pure metallic molybdenum itself or as a metallic molybdenum coating on particulated supports.

SUMMARY OF THE INVENTION

The benefits and advantages of the present invention are achieved by a process in which molybdenum trioxide is reacted with oxalic acid in an aqueous medium to produce aquaoxalatomolybdic (VI) acid, $H_2[MoO_3(C_2O_4)H_2O] \cdot H_2O$; hereinalso referred to as a molybdenum (VI) oxalate compound, which can be recovered from the solution by evaporation or can be applied in solution form to the surfaces of particulated porous material such as catalyst supports and thereafter dried leaving a residual adherent coating of the molybdenum oxalate compound thereon. The oxalate compound after substantially complete drying is thereafter reduced in hydrogen at an elevated temperature of from about 400° up to about 600°C maximum, whereby substantially all of the compound is converted to metallic molybdenum. Analyses of the metallic molybdenum produced either in a pure state or in the form of a coating on catalyst supports such as silica, alumina and zeolites, reveals the attainment of surface areas greater than 50 $m^2/g$, and more usually, substantially greater than 100 $m^2/g$, and wherein the metallic molybdenum is substantially devoid of any undesirable impurities such as chlorides and other metals frequently present when employing prior art techniques.

Still further benefits and advantages of the present invention will become apparent upon a reading of the description of the preferred embodiments taken in conjunction with the accompanying examples.

DESCRIPTION OF THE PREFERRED EMBODIMENTS

The present invention is based on the discovery that the provision of molybdenum in the form of the aquaoxalatomolybdic (VI) acid compound, $H_2[MoO_3(C_2O_4)H_2O] \cdot H_2O$, enables a hydrogen reduction thereof to produce a unique metallic molybdenum possessed of extremely high surface area which is substantially devoid of any residual contaminants other than possibly a small proportion of unreduced molybdenum dioxide, depending upon the specific conditions employed during the reduction step. These results are quite unexpected in that other organic complexes of molybdenum such as molybdenum formate and molybdenum citrate, when subjected to similar hydrogen reduction conditions, produce products having surface areas substantially less than 50 $m^2/g$, or alternatively, thermally decomposed forming carbonaceous tarry substances, preventing the attainment of a substantially pure metallic molybdenum product except for some $MoO_2$.

A particular advantage of the present process is that the starting material, i.e., aquaoxalatomolybdic (VI) acid, can readily be prepared in an aqueous solution utilizing molybdenum trioxide and oxalic acid and the resultant molybdenum oxalate compound can be isolated by simply evaporating water. The excellent solubility of the molybdenum oxalate compound in the solution also enables the impregnation of various catalyst supports such as silica, alumina and zeolite, providing for a substantially uniform coating deposit of the molybdenum oxalate compound upon evaporation of water. Also, the molybdenum oxalate solution can be added to the colloidal silica or alumina and the mixture subsequently gelled to form an intimate mixture of the molybdenum oxalate compound and the catalyst support. While the particular mechanism by which the unexpectedly high surface area metallic molybdenum product is obtained is not presently fully understood, a thermal decomposition and evolution of volatile constituents occurs during hydrogen reduction, whereby sublimed oxalic acid, water, carbon monoxide and carbon dioxide are liberated, leaving only a negligible carbon residue in the metallic product. The availability of comparatively pure molybdenum trioxide as a starting material also enables the preparation of the molybdenum oxalate compound such that the resultant metallic product is free of other undesirable contaminants.

As previously mentioned, the molybdenum oxalate compound can be conveniently prepared by dissolving equal molar quantities of a substantially pure molybdenum trioxide and oxalic acid in water. The pure compound can thereafter be isolated by evaporation of water and for this reason, it is usually preferred that solution concentrations of up to about 60% by weight of the molybdenum oxalate compound at 50°C are employed. When the molybdenum oxalate compound is to be used for impregnating porous catalyst supports, the compound similarly can be prepared in situ by dissolving molybdenum trioxide and oxalic acid in water, providing a solution concentration ranging from about 1% to about 60%. The specific concentration employed will depend to some extent on the desired concentration of metallic molybdenum in the final reduced product and the pore volume of the support material. The impregnation of the catalyst support is conveniently achieved by slurrying the catalyst support in the solution and thereafter recovering or extracting the impregnated solid by decantation and/or filtration.

In any event, the molybdenum oxalate compound or the catalyst support coated with the molybdenum oxalate compound is subjected to a drying or calcining step prior to the reduction step. This can conveniently be achieved by air drying at low or moderate temperatures, or by subjecting the compound to an initial calcining step at temperatures up to about 300°C in an inert or hydrogen atmosphere prior to the actual hydrogen reduction step. The drying step is carried out so as to remove substantially all of the uncombined residual water in the material.

The hydrogen reduction step is preferably performed under a stream of hydrogen at atmospheric pressure and with the molybdenum oxalate compound or the impregnated carrier support in a fluidized state for optimum efficiency. It is also contemplated, however, that the reduction step can be carried out with the material arranged as a fixed bed or as an agitated bed through which the hydrogen gas is passed. This is particularly true when pre-shaped and sized catalyst supports are impregnated which are of a size preventing fluidization thereof at reasonable hydrogen flow rates. While the hydrogen reduction step can be carried out at pressures below one atmosphere, an increase in time is necessary to achieve satisfactory reduction. On the other hand, hydrogen pressures above one atmosphere can also be satisfactorily employed but are usually less desirable because of the more costly equipment required.

The material and the interior of the reduction apparatus is preferably initially purged with an inert gas, such as argon for example, before the hydrogen gas is introduced. Any commercially available substantially pure and dry hydrogen gas can be employed to effect a reduction of the molybdenum oxalate compound. The hydrogen reduction is carried out at a temperature of at least about 400°C, at which a commercially practical rate of reaction is achieved up to temperatures approaching 600°C. Temperatures at or above about 600°C are undesirable due to a tendency of effecting a sintering of the reduced metal accompanied by a substantial reduction in its surface area. In accordance with the preferred practice, temperatures ranging from about 475° to about 500°C are employed.

In order to further illustrate the process of the present invention, the following examples are provided. It will be understood that the examples are provided for illustrative purposes and are not intended to be limiting of the scope of the invention as herein described and as set forth in the subjoined claims.

EXAMPLE 1

The preparation of a substantially pure high surface area metallic molybdenum is achieved by pulverizing a 54 gram sample of aquaoxalatomolybdic (VI) acid, $H_2[MoO_3(C_2O_4)H_2O] \cdot H_2O$, which is placed in a laboratory scale reduction reactor comprised of a heat resistant silica glass tube of a diameter of 1.5-inch and having a glass frit at the lower end thereof to permit fluidization of the molybdenum oxalate compound. The outlet of the reactor is provided with an indicating silica gel trap to visually evidence the evolution of water during the reduction reaction and thereby signal the progress of the reduction. The reactor is purged of air employing argon gas, whereafter hydrogen, as the reducing gas, is introduced through the base of the reactor.

The reactor is heated slowly from room temperature (25°C) to 300°C over a period of 4 hours, and thereafter maintained at 300°C for a period of 16 hours. The reactor is then heated to a temperature ranging from 480° to 500°C over a period of 4 hours and maintained at that temperature for a period of 48 hours. During the foregoing heating cycle, a fairly rapid evolution of water is observed to occur up to 300°C, accompanied by a deposition of small amounts of oxalic acid on the cooler portions of the reaction tube. The final reduced metallic product is black, pyrophoric and occupies substantially the same volume as the original charge material. Analyses of the metallic molybdenum product reveals a molybdenum content of 87.6% by weight, a residual carbon content of 0.121% by weight and a surface area (measured by the B E T method using nitrogen) of 170 m²/g.

EXAMPLE 2

The procedure as described in Example 1 is repeated with a final reduction heating cycle at 500°C of 72 hours instead of 48 hours as in Example 1. The resultant metallic molybdenum product on analysis contains 92.5% molybdenum, a negligible amount of carbon and is of a surface area of 123 m²/g.

EXAMPLE 3

The procedure as described in Example 1 is repeated with a final reduction cycle at 500°C extending for a period of 120 hours instead of only 48 hours. The resultant material contains 91.5% molybdenum, a negligible amount of carbon and has a surface area of 94 m²/g.

It is apparent from the results obtained in Examples 1–3 that a lengthening of the final reduction period is accompanied by a progressive reduction in surface area of the product which is believed due to a progressive sintering of the metallic molybdenum produced. The unreduced molybdenum constituent in the product is found to comprise molybdenum dioxide and it is further noted that the metallic molybdenum product produced is substantially free of any residual contaminants with carbon being present in only negligible amounts.

Procedures suitable for depositing a high surface area metallic molybdenum coating on the surfaces of porous alumina, silica and zeolite materials of the type typically employed as catalyst supports are described in Examples 4–7.

EXAMPLE 4

An alumina catalyst support is prepared by heating an alumina material available under the designation Catapal SB, available from Continental Oil Company, for a period of 3 hours at 550°C. The resultant alumina material has a surface area of 243 m²/g. An impregnation and coating of the catalyst is achieved by dissolving 28.1 grams of aquaoxalatomolybdic (VI) acid in 61.9 grams water, which is added to 90 grams of the alumina catalyst support. The resultant thick slurry is allowed to air dry at room temperature and subsequently powdered to a finely particulated state prior to initiation of the hydrogen reduction step.

The dried and pulverized catalyst support impregnated with the molybdenum oxalate compound is placed in a reactor and is fluidized in accordance with the procedure previously described in Example 1. After purging the reactor with argon, the powder is heated under hydrogen from room temperature to about 300°C over a period of 8 hours, and thereafter maintained at that temperature for an additional 16 hour period. Thereafter, the powder is heated from 300° to about 500°C over a period of four hours and held at that temperature for 48 hours. During the reduction, water is evolved at about 120°C with the material becoming gray-white at about 190°C, brown-black at about 300°C and, finally, black at 500°C. The final reduced product upon analysis contains 9.49% molybdenum and less than 0.038% carbon. The final product has a surface area of 260 m²/g.

EXAMPLE 5

A silica catalyst support is prepared by grinding a silica gel material designated as a Type 03 available from W. R. Grace and Company to a particle size of −10 to +30 mesh. The support has a surface area between 800 and 1000 m²/g. A molybdenum oxalate solution is prepared by dissolving 28.1 grams aquaoxalatomolybdic (VI) acid in 61.9 grams water at 50°C and the solution is thereafter filtered to remove traces of insolubles. The solution is then mixed with 83.57 grams of silica gel, and the resultant impregnated particles are air dried at room temperature.

The impregnated powder thus obtained is reduced under hydrogen employing the same conditions as described in Example 4, but without fluidizing the comparatively large silica particles. During the hydrogen reduction step, the material develops a black color at about 300°C. The final reduced product upon analysis has a surface area of 962.5 m²/g and contains 6.5% molybdenum and less than 0.038% carbon.

EXAMPLE 6

An acid stable Y-type zeolite catalyst support is provided which is commercially available under the designation SMR 54-806 molecular sieve U.S. 1, powder in acid form, available from Davidson Chemical-W. R. Grace and Company. The foregoing zeolite material is impregnated with a solution containing 28.1 grams of aquaoxalatomolybdic (VI) acid dissolved in 61.9 grams water at a temperature of 50°C. After filtering the solution, 90 grams of the zeolite molecular sieve material is slurried with the solution and thereafter the wet powder is extracted and air dried.

The dried impregnated powder is reduced by fluidizing in hydrogen in accordance with the procedure as previously described in Example 4. The final product is gray in appearance and has a surface area of 782 m²/g. Analyses evidence a molybdenum content of 8.09% and a carbon content of less than 0.038%.

EXAMPLE 7

A silica catalyst support is prepared by gelation of a colloidal type silica commercially designated as Ludox AM Colloidal Silica available from duPont in the presence of the molybdenum oxalate compound. This is achieved by dissolving 28 grams of aquaoxalatomolybdic (VI) acid in 300 grams of a colloidal silica solution containing 30% by weight silicon dioxide. The solution is thereafter converted into a thick gel by the addition of 64 milliliters of a 5.23% ammonia solution. The gel is then dried overnight at 70°C and ground to a particle size of −10 to +30 mesh.

The impregnated silica catalyst support is reduced employing the procedure as previously described in Example 4. The final product is black in appearance and has a surface area equal to 173.6 m²/g. Upon analysis, it is found to contain 7.5% molybdenum, 0.11% carbon, 0.15% nitrogen, 0.46% sodium and 0.17% aluminum. The sodium and aluminum impurities are introduced into the final product by way of the colloidal silica raw material.

It will be apparent from the procedures as described in the foregoing examples that metallic molybdenum either by itself or in the form of an adherent coating on porous catalyst supports can be simply and economically produced which are possessed of unexpectedly high surface areas. In contrast, the hydrogen reduction by fluidization of molybdenum dioxide particles of an average size of 0.61 microns employing substantially the same conditions as described in Example 1 is found to contain only a surface area of 21 m²/g after reduction for a period of 71 hours at 500°C. The hydrogen reduction by fluidizing a hydrous molybdenum trioxide feed material previously purified by passage through an ion exchange resin resulted in a black-appearing product having a surface area of only 66.6 m²/g utilizing substantially similar conditions as those described in Example 1. The formation of alternative organomolybdate compounds for hydrogen reduction proved unsuccessful. For example, an ammonium formatomolybdate compound upon hydrogen reduction resulted in a metallic molybdenum having a surface area of only 27.4 m²/g. An ammonium dicitratomolybdate thermally decomposed forming a tarry material and preventing the attainment of a reduced metallic molybdenum product. An ammonium molybdenum complex; ammonium dimolybdate upon reduction resulted in a metallic molybdenum product having a surface area of only 77.5 m²/g.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A process for preparing metallic molybdenum of high surface area which comprises the steps of providing a molybdenum compound consisting essentially of aquaoxalatomolybdic (VI) acid, and thereafter heating said molybdenum compound at a temperature of from about 400° up to about 600°C in a hydrogen reducing atmosphere for a period of time sufficient to thermally decompose and volatilize the oxalate constituent of said compound and to reduce substantially all of the molybdenum constituent thereof to a metallic state.

2. The process as defined in claim 1, in which the heating of said molybdenum compound is carried out at a temperature from about 475° to about 500°C.

3. The process as defined in claim 1, including the further step of fluidizing said molybdenum compound during at least a portion of the period during which it is heated in the presence of a hydrogen reducing atmosphere.

4. The process as defined in claim 1, including the further step of applying an aqueous solution containing said molybdenum compound dissolved therein to the surface of a porous catalyst support in a manner to effect an impregnation thereof and to deposit a coating of said molybdenum compound on the surfaces of said porous catalyst support which thereafter is heated at said temperature in said hydrogen reducing atmosphere.

5. The process as defined in claim 1, including the further step of applying an aqueous solution containing from about 1% up to about 60% by weight of said molybdenum compound dissolved therein to a porous catalyst support in a manner to effect an impregnation thereof and a deposition of a coating of said molybdenum compound on the surfaces thereof which thereafter is heated at said temperature in said hydrogen reducing atmosphere.

6. The process as defined in claim 1, wherein said heating is carried out for a period of time of about 48 hours.

7. The process as defined in claim 1, including the further step of subjecting said molybdenum compound to a drying step in a manner to remove substantially all of the uncombined water therefrom preliminary to the reduction of said molybdenum compound in said hydrogen reducing atmosphere.

8. The process as defined in claim 1, including the further step of subjecting said molybdenum compound to a calcining step at a temperature up to about 300°C in a nonoxidizing atmosphere in a manner to remove substantially all of the uncombined water therefrom preliminary to subjecting the molybdenum compound to the reduction step.

9. The process as defined in claim 1, including the further step of controlling the pressure of said hydrogen reducing atmosphere to a magnitude of about one atmosphere.

10. The process as defined in claim 1, in which the heating of said molybdenum compound is carried out at a temperature and for a period of time to effect a substantially complete reduction of said molybdenum constituent to a metallic state without encountering an appreciable sintering of the reduced metal.

* * * * *